3,261,313
METHOD OF UNITING POLYETHYLENE TEREPH-
THALATE APPAREL STAYS TO FABRICS
William MacLeod Champion, Circleville, Ohio, and
Sidney Commons Sanders, Bereldange, Luxembourg,
assignors to E. I. du Pont de Nemours and Company,
Wilmington, Del., a corporation of Delaware
No Drawing. Filed Mar. 16, 1965, Ser. No. 440,285
3 Claims. (Cl. 112—265)

This is a continuation-in-part of our copending application Serial No. 155,502, filed November 28, 1961, now abandoned.

This invention relates to a method of making stiffened fabrics and more particularly a method of making stiffened fabrics using stays of heavy gauge polyethylene terephthalate film having a birefringence of 0.058 or less.

The use of strips of heavy gauge polyethylene terephthalate film as apparel stays is well known in the garment industry. These strips are used for stiffening shirt collar points, brassieres, bathing suits, girdles, etc. Two pertinent patents among the many in this field are U.S. Patents 2,884,640 and 2,964,756 in which various configurations for placing apparel stays in different garments are disclosed using polyethylene terephthalate film strips.

It is common practice to stitch through some of these stays into the garments to keep them properly positioned. However, it has been found that at times the polyethylene terephthalate strips fracture or split badly when sewn, and sometimes splitting or fracturing occurs later during subsequent launderings or dry cleanings.

It is an object of this invention to provide a method of making stiffened fabrics using polyethylene terephthalate film.

It is a further object of this invention to provide a method of stiffening fabrics using apparel stays of heavy gauge polyethylene terephthalate film having a birefringence of 0.058 or less which are resistant to splitting or fracturing. These and other objects will appear hereinafter.

These and other objects are accomplished by the present invention which comprises a method of making a stiffened fabric comprising ascertaining the birefringence of biaxially oriented, heat-set polyethylene terephthalate film, and uniting stays made from said film to said fabric by stitches, utilizing the polyethylene terephthalate film which has been ascertained to have a birefringence of under about 0.058.

It has been surprisingly discovered that when heavy gauge polyethylene terephthalate film (from about 8 to 15 mils in thickness), preferably about 10 mils in thickness, is manufactured so that the birefringence is 0.058 or less, fracturing or splitting of apparel stays cut from this film does not occur during sewing or subsequent laundering or cleaning.

Polyethylene terephthalate film can be formed by the process disclosed in U.S. Patent 2,465,319. Polyethylene terephthalate can be prepared by the condensation of ethylene glycol and terephthalic acid or by carrying out an ester interchange reaction between ethylene glycol and a dialkyl ester of terephthalic acid, e.g., dimethyl terephthalate.

The molten polyethylene terephthalate must be cast under conditions such that the formed film, when solid, is substantially amorphous. This is conveniently accomplished by extruding the melt at a temperature of 270 to 315° C. onto a casting drum maintained at a temperature sufficiently low, e.g., 30 to 60° C. to effect rapid quenching or chilling of the polymer from the molten state such as is conventional in the art.

After the film is cast, it is then biaxially stretched and heat-set as described in U.S. Patent 2,823,421. The temperatures employed in stretching the film are those temperatures normally employed for the molecular orientation of polyethylene terephthalate film, i.e., about 80 to 100° C. Generally, temperatures above the second order transition temperature but below the crystalline melting range can be employed. Stretching is accomplished in conventional apparatus designed to stretch continuous web material longitudinally and transversely.

It is necessary that the polyethylene terephthalate film useful in making the apparel stays of the present invention has a birefringence of about 0.058 or less. Preferably, the amorphous polyethylene terephthalate film is stretched in both directions to obtain a final thickness of about 10 mils and preferably, the film has a birefringence of about 0.0450.

Birefringence was selected for measuring the stitchability of polyethylene terephthalate film. It is a measure of unidirectional orientation solely at the zone where the film, during manufacture, passes from the cool, final stretch zone to the hotter heat-set zone. It is here that the phenomena of "bowing" occurs. In "bowing" the edges of the film lead the center with resultant stretching of the film near the edges. It is here that birefringence is important and is measured at the edges of the film. If the birefringence is under 0.058 at the edges, it is also under 0.058 at the center and the film can be used. Birefringence is obtained by calculating the difference between (1) the refractive index of the film determined by directing a beam of light parallel to the plane of the film in the direction of maximum orientation and (2) the refractive index of the film determined by directing a beam of light parallel to the plane of the film in a direction mutually perpendicular to the direction of maximum orientation. The refractive index is measured with an Abbe refractometer.

In cutting apparel stays from this film, it makes no difference whether the stays are cut in the longitudinal direction of the film or the transverse direction. In all cases in the examples that follow, neither a particular sewing machine nor a particular needle was found to cause splitting or fracturing when the stays were sewed on the fabric. Birefringence was always the deciding factor.

Various commercial sewing machines and needles are used in the trade for sewing polyethylene terephthalate stays to fabrics. Such sewing machines include Singer #241, Singer #400 W–1, Singer #400 W–21, etc. The needles used are usually #11 to a #16, both ball point and sharp point.

The invention will be more fully understood by referring to the following examples:

*Example I*

Biaxially oriented, heat-set polyethylene terephthalate film 10.6 mils thick, with a birefringence of 0.064, was cut into strips approximately ⅜ inch wide and 2½ inches long at right angles to the direction of extrusion of the original film. The strips were then sewn lengthwise through the center of each strip to a regular collar lining material, using a commercial type #400 W–1 Singer sewing machine and a sharp point #16 needle. Splitting and fracturing of the strips occurred, showing that they were unfit for use as stays.

*Example II*

Biaxially oriented, heat-set polyethylene terephthalate film 9.5 mils thick, with a birefringence of 0.037, was cut into strips approximately ⅜ inch wide and 2½ inches long and sewn lengthwise through the center of the strip to a regular collar lining material, using a #241 Singer sewing machine and a sharp point #11 needle. There was no sign of any splitting or fracturing.

Example III

Biaxially oriented, heat-set polyethylene terephthalate film 8.9 mils thick, with a birefringence of 0.068, was cut into strips and sewn in the same manner as in the preceding examples, using a #14 sharp point needle on a #400 W-21 Singer machine. The strips split and fractured badly.

Example IV

Biaxially oriented, heat-set polyethylene terephthalate film 11.0 mils thick, with a birefringence of 0.030, gave strips with excellent sewing properties, and no splitting using a #11 ball point needle on a #241 Singer machine.

Example V

Biaxially oriented, heat-set polyethylene terephthalate film 14 mils thick, with a birefringence of 0.057, had excellent sewing properties with no splitting.

Example VI

Biaxially oriented, heat-set polyethylene terephthalate film 10.2 mils thick, with a birefringence of 0.062, gave strips which showed a decided tendency to split and fracture when sewn to fabric.

Example VII

Biaxially oriented, heat-set polyethylene terephthalate film 8.9 mils thick, with a birefringence of 0.0191, gave strips which sewed without splitting or fracturing.

From the foregoing examples it is readily seen that when polyethylene terephthalate film with a birefringence of about 0.058 or less is used, stays result which show no splitting or fracturing when sewn to fabrics.

What is claimed is:

1. In a method of making a stiffened fabric, comprising, ascertaining the birefringence of biaxially oriented, heat-set polyethylene terephthalate film, and uniting stays made from said film to said fabric by stitches, utilizing the polyethylene terephthalate film which has been ascertained to have a birefringence of under about 0.058.

2. In a method of making a stiffened fabric, comprising, ascertaining the birefringence of biaxially oriented, heat-set polyethylene terephthalate film having a thickness from about 8 to 15 mils, and uniting stays made from said film to said fabric by stitches, utilizing the polyethylene terephthalate film which has been ascertained to have a birefringence of under about 0.058.

3. The method of claim 2 wherein the biaxially oriented, heat-set polyethylene terephthalate film is about 10 mils thick and has a birefringence of about 0.045.

References Cited by the Examiner

UNITED STATES PATENTS

| | | | |
|---|---|---|---|
| 2,823,421 | 2/1958 | Scarlett | 264—216 |
| 2,884,460 | 5/1959 | Liebowitz | 2—132 |
| 2,964,756 | 12/1960 | Liebowitz | 2—132 |

ALEXANDER WYMAN, *Primary Examiner.*

G. D. MORRIS, *Assistant Examiner.*